United States Patent
Ma et al.

(10) Patent No.: US 12,388,894 B1
(45) Date of Patent: Aug. 12, 2025

(54) INFORMATION PROCESSING METHOD, CONTROLLER CLUSTER, ELECTRONIC DEVICE, AND MEDIUM

(71) Applicant: SUZHOU METABRAIN INTELLIGENT TECHNOLOGY CO., LTD., Jiangsu (CN)

(72) Inventors: Minghui Ma, Jiangsu (CN); Kun He, Jiangsu (CN)

(73) Assignee: SUZHOU METABRAIN INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 19/116,198

(22) PCT Filed: May 24, 2024

(86) PCT No.: PCT/CN2024/095328
§ 371 (c)(1),
(2) Date: Mar. 27, 2025

(87) PCT Pub. No.: WO2025/055384
PCT Pub. Date: Mar. 20, 2025

(30) Foreign Application Priority Data

Sep. 12, 2023 (CN) .......................... 202311167753.7

(51) Int. Cl.
*H04L 67/1095* (2022.01)
*H04L 67/142* (2022.01)

(52) U.S. Cl.
CPC ........ *H04L 67/1095* (2013.01); *H04L 67/142* (2013.01)

(58) Field of Classification Search
None
See application file for complete search history.

(56) References Cited

U.S. PATENT DOCUMENTS

| | | | | |
|---|---|---|---|---|
| 2009/0063760 A1* | 3/2009 | Weddle | ............... | G06F 13/1689 711/E12.001 |
| 2011/0137879 A1* | 6/2011 | Dubey | ............... | G06F 16/1774 707/704 |
| 2018/0364915 A1* | 12/2018 | Li | ............... | G06F 12/0808 |

FOREIGN PATENT DOCUMENTS

CN 116909759 A 10/2023

OTHER PUBLICATIONS

Ashjaei et al., "Dynamic reconfiguration in HaRTES switched ethernet networks", May 1, 2016, IEEE, 2016 IEEE World Conference on Factory Communication Systems (WFCS) (2016, pp. 1-8) (Year: 2016).*

* cited by examiner

*Primary Examiner* — Davoud A Zand
(74) *Attorney, Agent, or Firm* — IPro, PLLC (57) ABSTRACT

A method for processing information includes: performing any of followings when there is no node event: receiving a target request, and converting a local node state of a node into a first state, the target request being used for initiating a target information synchronization task, and the first state being used for characterizing that the node is executing the target information synchronization task as a remote node; and transmitting the target request, and converting the local node state of the node into a second state, the second state being used for characterizing that the node is executing the target information synchronization task as a primary writing node. The controller cluster is configured to unidirectionally transmit the target request between the primary writing node and the remote node in a same domain according to a set communication direction.

20 Claims, 7 Drawing Sheets

INFORMATION PROCESSING METHOD, CONTROLLER CLUSTER, ELECTRONIC DEVICE, AND MEDIUM

CROSS-REFERENCE TO RELATED APPLICATION

This application claims the priority of the Chinese Patent application filed on Sep. 12, 2023 before the CNIPA, China National Intellectual Property Administration with the application number of 202311167753.7, and the title of "METHOD AND APPARATUS FOR PROCESSING INFORMATION, DEVICE, MEDIUM, AND CONTROLLER CLUSTER", which is incorporated herein in its entirety by reference.

FIELD

The present application relates to the technical field of communications and more particularly, to a method and apparatus for processing information, a device, a medium, and a controller cluster.

BACKGROUND

Nodes in a controller cluster achieve synchronization of target information, such as an execution condition of a backend task, by communicating with each other, to ensure that the target information of the nodes will not be lost when the nodes are offline. However, each node needs to maintain a large number of communication states related to a target information synchronization task for surrounding nodes.

SUMMARY

An objective of embodiments of the present application is to provide a method and
apparatus for processing information, a device, a medium, and a controller cluster, which may reduce communication states that need to be maintained by a node.

To solve the foregoing technical problem, in a first aspect, the embodiments of the present application provide a method for processing information, which is applied to any node in a controller cluster and includes:
performing any of followings when there is no node event:
receiving a target request, and converting a local node state of a node into a first state, the target request being used for initiating a target information synchronization task, and the first state being used for characterizing that the node is executing the target information synchronization task as a remote node; and
transmitting the target request, and converting the local node state of the node into a second state, the second state being used for characterizing that the node is executing the target information synchronization task as a primary writing node.

The controller cluster is configured to unidirectionally transmit the target request between the primary writing node and the remote node in a same domain according to a set communication direction.

In a second aspect, the embodiments of the present application further provide a controller cluster, including a primary writing node and a remote node in at least one domain, wherein the controller cluster is configured to unidirectionally transmit a target request between the primary writing node and the remote node in a same domain according to a set communication direction, and the target request is used for initiating a target information synchronization task;
the remote node is configured to receive the target request when there is no node event, and convert a local node state thereof into a first state, the first state being used for characterizing that the remote node is executing the target information synchronization task required to be executed when serving as the remote node; and
the primary writing node is configured to transmit the target request when there is no node event, and convert a local node state thereof into a second state, the second state being used for characterizing that the primary writing node is executing the target information synchronization task required to be executed when serving as the primary writing node.

In a third aspect, the embodiments of the present application further provide an apparatus for processing information, applied to any node in a controller cluster and including:
a first execution module, configured to execute any one of followings when there is no node event:
receive a target request, and convert a local node state of a node into a first state, the target request being used for initiating a target information synchronization task, and the first state being used for characterizing that the node is executing the target information synchronization task as a remote node; and transmit the target request, and convert the local node state of the node into a second state, the second state being used for characterizing that the node is executing the target information synchronization task as a primary writing node;
wherein the controller cluster is configured to unidirectionally transmit the target request between the primary writing node and the remote node in a same domain according to a set communication direction.

In a fourth aspect, the embodiments of the present application further provide an electronic device, including a memory, a processor, and a computer program stored in the memory, wherein the processor executes the computer program to implement the method for processing information according to the first aspect.

In a fifth aspect, the embodiments of the present application further provide a non-transitory computer-readable storage medium, having a computer program/instructions stored therein, wherein a processor executes the computer program/instructions to implement the method for processing information according to the first aspect.

In a sixth aspect, the embodiments of the present application further provide a computer program product including a computer program/instruction that, when executed by a processor, implements the method for processing information according to the first aspect.

It may be seen from the foregoing technical solution that by configuring each node in the controller cluster to unidirectionally transmit the target request according to the set communication direction when there is no node event, the number of times of communication between the nodes may be reduced in the case of meeting the target information synchronization requirements of each node. On this basis, the node may only maintain a communication state according to a receiving condition of the target request, and does not need to maintain a communication state for each surrounding node. In this way, the communication states that need to be maintained by the node may be reduced, thereby improving the execution efficiency of the target information synchronization task.

BRIEF DESCRIPTION OF THE DRAWINGS

In order to provide a clearer explanation of the embodiments of the present application, a brief introduction will be given to the drawings required for use in the embodiments. It is obvious that the drawings described below are only some embodiments of the present application. For those skilled in the art, other drawings may be obtained based on these drawings without creative work.

DETAILED DESCRIPTION

The following will provide a clear and complete description of the technical solution in the embodiments of the present application combined with the accompanying drawings of the present application. Obviously, the described embodiments are only a part of the embodiments of the present application, not all of them. Based on the embodiments in the present application, all other embodiments obtained by persons skilled in the art without creative work are within the scope of protection of the present application.

The terms "including/comprising" and "having" as well as any variations thereof in the specification and claims of the present application and the accompanying drawings are intended to cover non-exclusive inclusion. For example, a process, method, system, product, or device that includes a series of steps or units is not limited to the listed steps or units, but may include steps or units that are not listed.

First, to facilitate the understanding of the information processing solution acceding to the embodiments of the present application, the following will be described.

Asynchronous task: it is a type of task that is initiated by one thread, is in a waiting scheduling queen, and may not be executed at the same time as a current thread.

Node: it represents a certain controller in a controller cluster.

Remote node: the other node in a node view of a two-node system.

Primary writing node: it is a node that processes input/output (I/O) within a domain composed of the node and a remote node, and is also referred to as a primary node or a home node.

Metadata: it is recorded data information that is stored in non-transitory storage and records an execution condition of a backend task.

Backend task: it is a task executed in parallel with read-write I/O, and mainly includes initialization of disk data, reconstruction of lost data, and checking and repairing in case of read-write error.

Redundant array of independent disks (RAID) refers to an array composed of a series of hard disks. In the RAID, a fault-tolerant operation and recovery of an underlying disk are managed. At the software level, the RAID configured to manage the operation of the hard disk array is commonly referred to as a soft RAID. During management of data of the disk array, the most important task is to ensure the security and reliability of the data stored in the disk. Therefore, tasks (namely, backend tasks) executed by a backend, such as initialization, reconstruction, validation and reconstruction, slow disk repair, and patrol inspection are formed in the soft RAID, to perform determination and supervision of an abnormity, and correction and recovery of data after an abnormal condition.

In this premise, controllers (namely, nodes) in a multi-controller system (namely, a controller cluster) communicate with each other to ensure that target information of a relevant process (mainly including metadata used for recording an execution condition of a backend task) will not be lost when the controllers are offline. Meanwhile, in order to avoid the impact on the frontend I/O (namely, input/output storage), the controller synchronizes the target information, such as metadata, of the backend task in an asynchronous manner (that is, through an asynchronous task), to achieve mutual communication among a plurality of nodes through the asynchronous task, which ensures that in an abnormal case, such as node offline and recovery, the execution condition (namely, the metadata) of the background task that is currently executed will not be lost due to node offline. In this way, the consistency of data in the disk is maintained.

Figure 1:
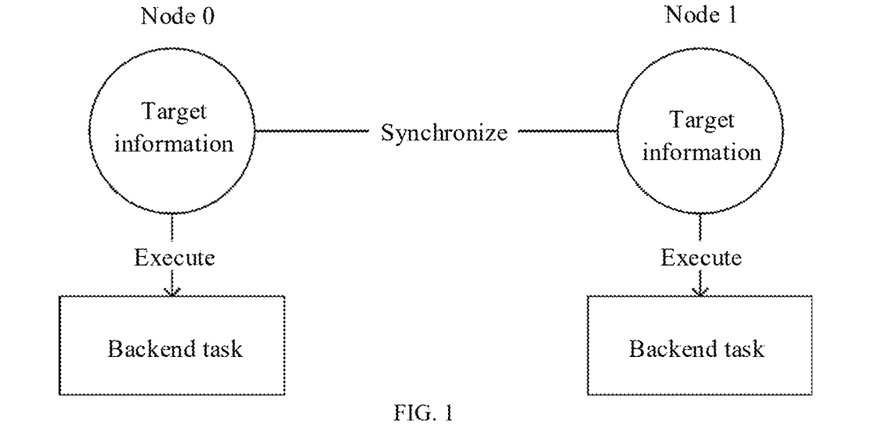
FIG. 1 is a schematic diagram of target information synchronization between two nodes in the related art.
Figure 2:
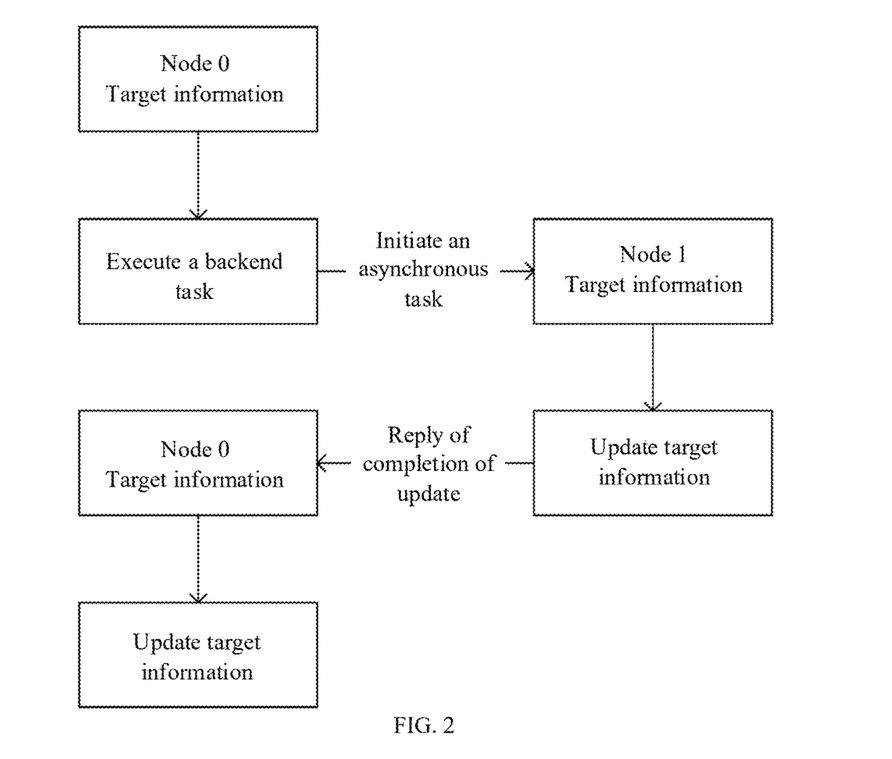
FIG. 2 is a schematic diagram of target information update performed by a node in the related art.

As shown in FIG. 1, in a process of maintaining target information stored on a present node, to manufacture redundancy and prevent the target information belonging to the node from being lost due to node offline, which affects a fault-tolerant operation of a disk in a backend task, nodes (such as, a node 0 and a node 1) will mutually synchronize their own target information. As shown in FIG. 2, a node initiates an asynchronous task while executing a backend task (that is, initiating a target information synchronization task), and after receiving a reply indicating successful remote update (that is, a remote node completes the target information synchronization task), and the node updates local target information to complete its own target information synchronization task, thereby realizing the backup of the target information.

Figure 3:
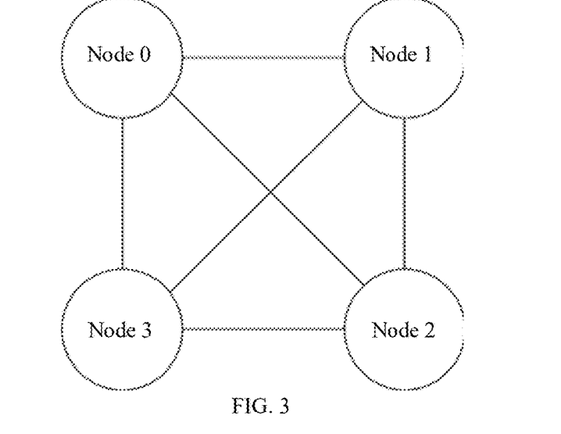
FIG. 3 is a schematic diagram of a four-node system in the related art.

A conventional asynchronous task interaction mode may be briefly described as follows: a node determines whether to initiate operations such as transmission of information, processing of received information, and conflict processing, between the node and other nodes by respectively recording different states of each surrounding node under a transmission/receiving condition. In some embodiments, the node maintains a communication state between two nodes under different conditions by setting 11 different communication states locally, and determines whether to transmit or process information related to a target information synchronization task according the communication states. However, due to bidirectional communication between the nodes, the node needs to maintain one of the foregoing communication states between the two nodes for each node communicating with the node. As shown in FIG. 3, in a four-node system, every two nodes synchronize their own target information with each other, and for any node (such as a node 0), the node needs to maintain a communication state between the node and each other node (such as a node 1, a node 2, or a node 3). For example, when receiving a target request of the node 1, the node 2, or the node 3, the node 0 needs to convert a local node state 1 for the node 1 into a reception-related state 1, convert a local node state 2 for the node 2 into a reception-related state 2, or convert a local node state 3 for the node 3 into a reception-related state 3. Each node needs to maintain a large number of communication states, thereby reducing the efficiency of mutual communication between nodes. Therefore, the execution efficiency of the target information synchronization task is affected.

In view of the problems in the related art, the present application proposes an information processing solution. By configuring each node to unidirectionally transmit a target request when there is no node event, the number of times of communication between nodes may be reduced in the case of meeting the target information synchronization requirements of each node. On this basis, the node may only maintain a communication state according to a receiving condition of the target request, and does not need to maintain a communication state for each surrounding node. In this way, the communication states that need to be maintained by the node may be reduced, thereby improving the execution efficiency of the target information synchronization task.

The following describes a method and apparatus for processing information, a device, a medium, and a controller cluster provided in the embodiments of the present application in detail with reference to the accompany drawings through some embodiments and application scenarios.

Figure 4:
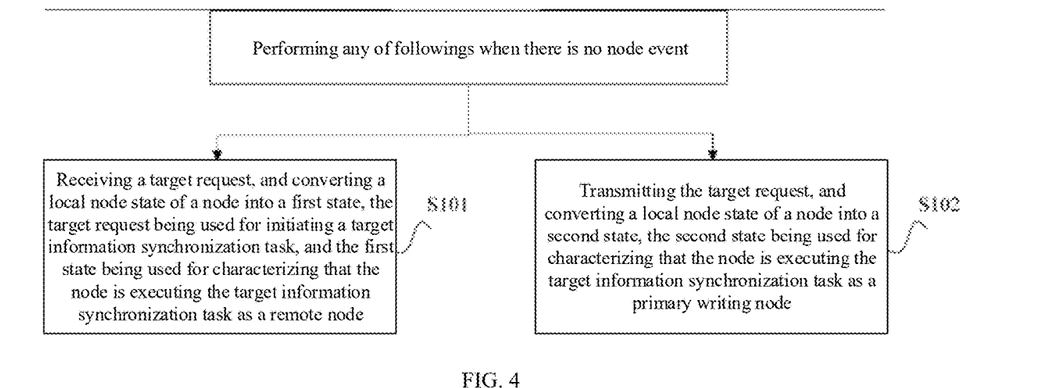
FIG. 4 is a flowchart of an implementation of a method for processing information according to an embodiment of the present application.

In a first aspect, FIG. 4 is a flowchart of an implementation of a method for processing information according to an embodiment of the present application, and the method for processing information is applied to any node in a controller cluster and includes the following steps:

performing any of followings when there is no node event:

Step S101: receiving a target request, and converting a local node state of a node into a first state, the target request being used for initiating a target information synchronization task, and the first state being used for characterizing that the node is executing the target information synchronization task as a remote node; and Step S102: transmitting the target request, and converting the local node state of the node into a second state, the second state being used for characterizing that the node is executing the target information synchronization task as a primary writing node.

The controller cluster is configured to unidirectionally transmit the target request between the primary writing node and the remote node in the same domain according to a set communication direction. No node event refers to that: no pre-defined node event (such as an abnormal node event, a first node event, a second node event, or a third node event described below) occurs on the node.

Figure 5:
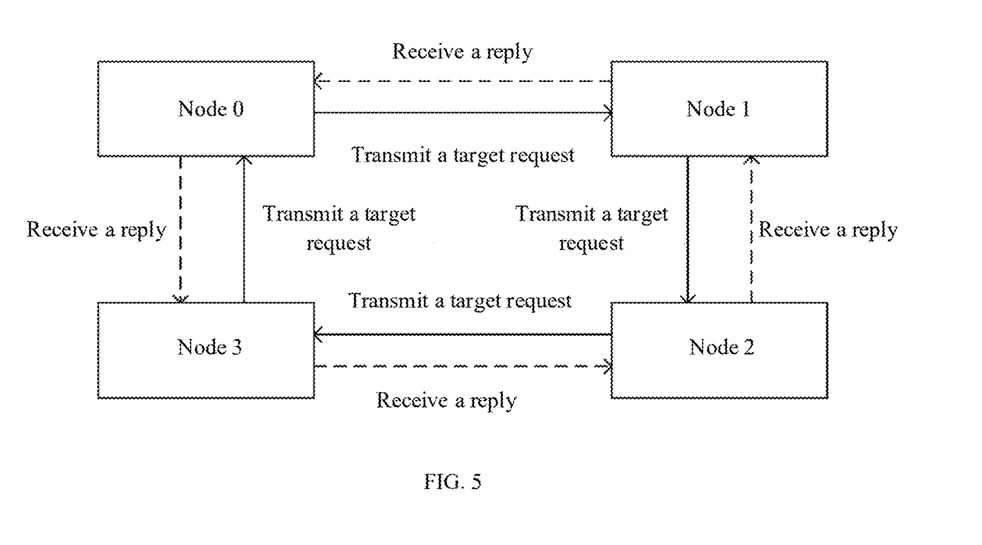
FIG. 5 is a schematic diagram of communication in a four-node system according to an embodiment of the present application.

A description is made by taking maintenance of a communication state in a four-node system as an example. As shown in FIG. 5, a previous node and a next node (such as a node 0 and a node 1, the node 1 and a node 2, the node 2 and a node 3, or the node 3 and the node 0) in the four-node system are a primary writing node and a remote node in the same domain respectively. At this point, according to a set communication direction, the node, as the primary writing node of the next node, transmits a target request for synchronizing target information of the node to the next node, and the node, as the remote node of the previous node, receives the target request transmitted by the previous node to synchronize the target information of the previous node, thereby meeting the target information synchronization requirements of the node. In this way, when any node in the system in an abnormal scene such as offline or recovery, there is a node which saves the target information of the node.

Figure 6:
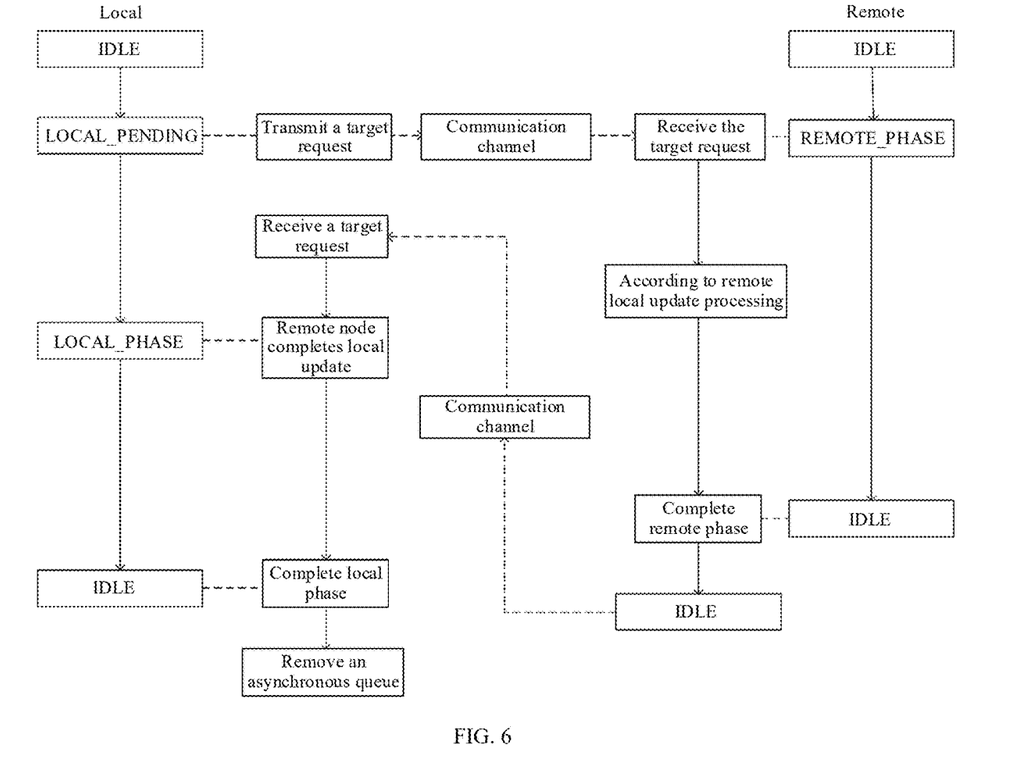
FIG. 6 is a schematic diagram of a communication state maintained by a node according to an embodiment of the present application.

As shown in FIG. 6, when transmitting the target request, the node converts the local node state into the second state, for example, converts a current idle (IDLE) state into a local (LOCAL)-related state (namely, the second state), which characterizes that the node is executing the target information synchronization task as the primary writing node. In some embodiments, when transmitting the target request, the node may be converted into a local pending (LOCAL_PENDING) state, which characterizes that the node, as the main writing node, is waiting for a remote node to complete local update processing according to target information of the primary writing node. After receiving a reply characterizing that the remote node completes the local update processing, the node is converted from the LOCAL_PENDING state to a local phase (LOCAL_PHASE) state, which characterizes that the node is performing local update processing as the primary writing node. After completing the local update processing, the node is converted into IDLE, which characterizes that the node completes the target information synchronization task required to be executed when serving as the primary writing node.

Similarly, when receiving a target request, the node converts the local node state into the first state, for example, converts the current IDLE into a remote (REMOTE)-related state (namely, the first state), which characterizes that the node is performing the target information synchronization task as the remote node. In some embodiments, when receiving the target request, the node may be converted into a remote pending (REMOTE_PENDING) state, which characterizes that the node, as the remote node, is waiting to perform local update processing, or may be converted to a remote phase (REMOTE_PHASE) state, which characterizes that the node is performing local update processing as the remote node. After completing the local update processing, the node transmits a reply characterizing that the remote node completes the local update processing to a primary writing node, and then is converted into the idle state, which characterizes that the node completes the target information synchronization task required to be executed when serving as the remote node.

It may be understood that different domains composed of two different nodes (namely, a primary writing node and a remote node) in the controller cluster will manage a hard disk array in stripes, that is, one domain is responsible for processing only a part of the stripes to achieve lock-free processing. However, the conventional target information synchronization task is initiated between any two nodes, so that two nodes in different domains also access each other to synchronize their own target information, which is not conducive to lock-free processing, and leads to unnecessary communication overhead in the controller cluster (namely, communication overhead generated by target information synchronization of nodes in different domains).

Therefore, a single node needs to maintain more communication states for more nodes.

In the embodiments of the present application, the target request is unidirectionally transmitted between nodes in a domain composed of the node and the remote node in the controller cluster according to a set communication direction, so that the process in which the node, as the primary writing node, synchronizes target information to the remote node, and the process in which the node, as the remote node, synchronizes the target information of the primary writing node only occur between two nodes in the same domain and the direction of the target information synchronization is consistent. For example, a communication direction from a primary writing node for managing a stripe corresponding to a domain where it is located to a remote node in the domain may be taken as the foregoing set communication direction. In this way, in the absence of a node event, a node may, as a primary writing node, only transmit a target request to a remote node in a domain where the node when serving as the primary writing node is located to synchronize its own target information to the remote node, and the node may, as a remote node, only receive a target request from a primary writing node in a domain where the node when serving as the remote node is located to synchronize target information of this primary writing node. That is, the node does not transmit a target request to nodes in different domains or receive target requests from nodes in different domains at the same time. Therefore, the calculation cost of a mutual index between nodes may be reduced. On the basis of meeting the target information synchronization requirements in each domain, the number of times of communication between nodes and communication states that characterize different communication conditions between nodes and are need to be maintained by the nodes. On this basis, each node chooses to maintain the communication state based on its own transmission/receiving condition of the target information, rather than maintaining the communication state separately for each surrounding node in the way of distinguishing nodes, which may further reduce the communication states that need to be maintained by the node to ultimately improve the execution efficiency of the target information synchronization task, and facilitates the problem analysis under the abnormal communication conditions.

It may be seen from the foregoing technical solution that by configuring each node in the controller cluster to unidirectionally transmit the target request according to the set communication direction in the absence of a node event, the number of times of communication between the nodes may be reduced in the case of meeting the target information synchronization requirements of each node. On this basis, the node may only maintain a communication state according to a receiving condition of the target request, and does not need to maintain a communication state for each surrounding node. In this way, the communication states that need to be maintained by the node may be reduced, thereby improving the execution efficiency of the target information synchronization task.

Embodiment 1

An example of processing of a conflict between receiving and transmission states is described in this embodiment.

When a first node event occurs on a node, a local node state of the node is converted into a third state corresponding to the first node event. The third state is used for characterizing that the node is performing target information synchronization tasks as a primary writing node and a remote node at the same time.

It may be understood that considering that when executing the target information synchronization task as the remote node, the node may also serve as the primary writing node and transmit a target request to a remote node to initiate a target information synchronization task. When executing the target information synchronization task as the primary writing node, the node may also serve as the remote node and receive the target request transmitted from a primary writing node to accept the target information synchronization task initiated by this primary writing node. Since the node maintains a uniform communication state in a way of not distinguishing nodes, that is, the node does not maintain a state characterizing that the node, as the primary writing node or the remote node, is executing the target information synchronization task with another specific node separately. Therefore, in the case of unidirectional transmission of the target request, the first node event indicating a conflict between receiving and transmission states may occur on the node. In view of this, the embodiments of the present application provide the third state to achieve communication state maintenance on a communication condition related to the first node event. The node may convert the local node state into the third state to trigger that the node preferentially serves as the primary writing node or the remote node according to a set execution order to perform a corresponding target information synchronization task.

In some embodiments, the node may determine whether the first node event occurs on the node according to the local node state and a current transmission condition of the target request. For example, the node may determine that the first node event occurs on the node according to any one of following combinations of the local node state and the transmission condition including that:

the node transmits the target request when the node is in the first state (namely, a receiving state); and
the node receives the target request when the node is in the second state (namely, a transmission state).

In some embodiments, when the node is in the third state, a first execution order in which the node executes the target information synchronization task as the primary writing node and the remote node, respectively, is determined.

According to the first execution order, the local node state of the node is converted into a fourth state. The fourth state is used for characterizing that the node is executing the target information synchronization task required to be executed when serving as the primary writing node and the target information synchronization task required to be executed when serving as the remote node respectively according to the first execution order.

In an embodiment, the third state may be taken as an intermediate state, which triggers that the node determines the first execution order. After the node determines the first execution order, the local node state may be converted into the fourth state, which triggers that the node sequentially executes the target information synchronization tasks required to be executed when serving as the primary writing node and the remote node, respectively, according to the first execution order, thereby processing the conflict between the receiving and transmission states. A corresponding fourth state may be set according to different execution orders, such as a fourth state for preferentially processing local transmission and a fourth state for preferentially processing remote receiving. Subsequently, the node may execute the target information synchronization tasks required to be executed when serving as the primary writing node and the remote node, respectively, according to the execution order corresponding to the fourth state of the node.

In some embodiments, when the first node event occurs on the node and the node completes the target information synchronization tasks required to be executed when serving as the primary writing node and the remote node, respectively, the local node state of the node is converted into a fifth state (such as IDLE) used for characterizing that no target information synchronization task is executed. When receiving or transmitting a target request later, the node may normally record a communication condition between nodes by the foregoing method for maintaining a communication state in the absence of a node event.

In an embodiment, the node superimposes the first state and the second state according to the first execution order, to obtain the fourth state, and the local node state of the node is converted into the fourth state.

In an embodiment, when a conflict exists between the receiving state and the transmission state (such as the first state and the second state) of the node, the receiving state and the transmission state are superimposed according to the first execution order, to obtain the fourth state corresponding to the first execution order, which triggers that the node correspondingly execute the target information synchronization tasks according to the first execution order. The number of the communication states that need to be maintained by the node may be further reduced by adopting one superimposed state to record that the node is in the receiving and transmission states.

In some embodiments, after the converting the local node state of the node into a fourth state, the method further includes:

when the node completes the target information synchronization task as the remote node, converting the local node state of the node into a local node state from which one first state is removed; and when the node completes the target information synchronization task as the primary writing node, converting the local node state of the node into a local node state from which one second state is removed.

In an embodiment, for the node in the superimposed state corresponding to the conflict between the receiving states and the transmission state, when the node completes the corresponding target information synchronization task as the primary writing node or the remote node, the node is converted from the foregoing superimposed state into a corresponding single state, namely, only the receiving state or transmission state, so that the node is restored to a related communication state in the absence of a node event, and normally executes a corresponding target information synchronization task as the primary writing node or the remote node. Through the foregoing conversion among the first state to the fifth state, the node may maintain the communication state under different receiving/transmission conditions (for example, only remote receiving, only local transmission, or both remote receiving and local transmission), thereby reducing the communication states that need to be maintained by the node.

Figure 7:
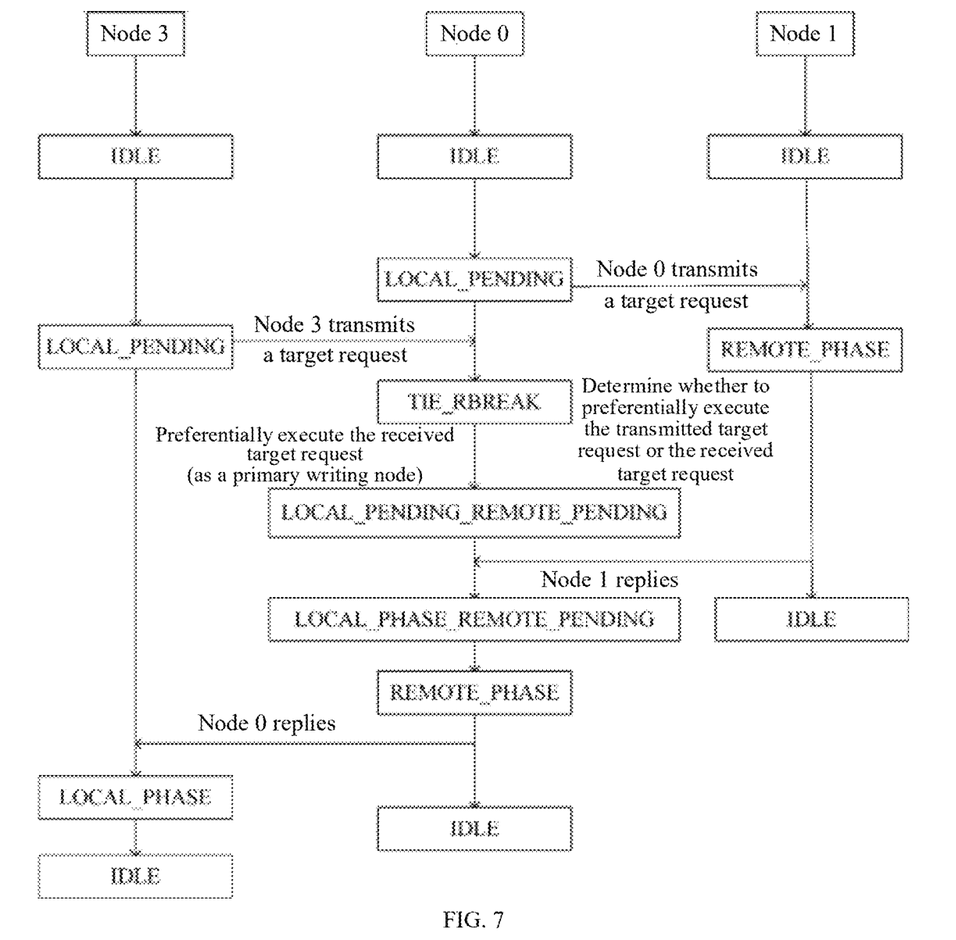
FIG. 7 is a schematic diagram of a communication state conversion under a conflict between a receiving state and a transmission state according to an embodiment of the present application.

Exemplarily, as shown in FIG. 7, a communication state conversion of a node under a collision between receiving and transmission states is as follows:

1. A node 0 transmits a target request to a node 1, and the node 0 records that a local node state is converted from IDLE to a LOCAL-related state (namely, the second state), which indicates that the node 0, as a primary writing node, is synchronizing metadata to a remote node (the node 1). The metadata of the primary writing node may be transmitted to the remote node along with the target request.

2. The node 0 receives a target request and records that the local node state is converted from IDLE to a REMOTE-related state (namely, the first state), which indicates that the node 1, as the remote node, is receiving the metadata of the primary writing node (the node 0) in a domain, the node 1 replies to the node 0 after completing local update processing according to the metadata of the node 0, and the node 0 is converted into the idle state, which indicates that the node 1 completes the metadata synchronization task (namely, a target information synchronization task).

3. When transmitting a target request to the node 1 and receiving a target request transmitted by a node 3, the node 0 records that the local node state is converted into a tier break (TIER_BREAK) state (namely, the third state), which indicates that the node is in a state where a transmission process and a receiving process exist simultaneously (namely, a conflict exists between the receiving state and the transmission state).

4. The node 0 determines a first execution order according to a set determination condition (for example, according to the order of transmitting and receiving a target request by the node, or preferentially processing local transmission, or preferentially processing local receiving), and when it is determined that the first execution order is preferentially processing local transmission, the local node state is converted into a state in which the LOCAL-related state and the REMOTE-related state are successively superimposed (namely, a fourth state, which may be LOCAL_ . . . REMOTE_ . . . here), and after a reply transmitted by the node 1 is received, the state is converted into the REMOTE-related state (such as REMOTE . . . ) which is not superimposed. Similarly, when the node 0 is in a state for preferentially processing remote receiving, the local node state is converted into a state in which the REMOTE-related state and the LOCAL-related state are successively superimposed (namely, a fourth state, which may be REMOTE . . . LOCAL_ . . . here), and after the node 0 completes the receiving flow as the remote node, that is, updates the local metadata, the local node state is converted into the LOCAL-related state (such as LOCAL_ . . . ) which is not superimposed.

5. After being converted from the superimposed state to the non-superimposed state, that is, according to the current non-superimposed state (such as the first state or the second state), the node 0 normally executes the related metadata synchronization task as the primary writing node or the remote node.

Embodiment 2

An example of processing of a conflict between a plurality of receiving states is described in this embodiment.

In the case where a second node event occurs on a node, a local node state of the node is converted into a sixth state corresponding to the second node event. The sixth state is used for characterizing that the node is executing a plurality of target information synchronization tasks as a remote node.

It may be understood that considering that when some abnormal node events occur (such as a node returning after being offline), the node may need to process target requests from nodes in two different domains (that is, the second node event occurs). In view of this, the embodiments of the present application provide the sixth state to achieve communication state maintenance on a communication condition related to the second node event. The node may convert the local node state into the sixth state to trigger that the node executes the plurality of target information synchronization tasks as the remote node according to a set execution order. For example, the node may execute the plurality of target information synchronization tasks according to the order of receiving target requests corresponding to the plurality of target information synchronization tasks when in the sixth state. For example, the node preferentially executes the target information synchronization task corresponding to the target request received earlier.

As a possible embodiment, when the second node event occurs on the node and the node completes the plurality of target information synchronization tasks as the remote node, the local node state of the node is converted into the fifth state (such as IDLE) used for characterizing that no target information synchronization task is executed. When receiving or transmitting a target request later, the node may normally record a communication condition between nodes by the foregoing method for maintaining a communication state in the absence of a node event.

In some embodiments, the node may determine whether the second node event occurs on the node according to the local node state of the node and a current receiving condition of the target request. For example, the node may determine that the second node event occurs on the node according to the following combination of the local node state and the current receiving condition: the node receives the target request when in the first state (namely, the receiving state).

In some embodiments, before the converting the local node state of the node into a sixth state corresponding to the second node event, the method further includes:
   superposing target states with a same number as the plurality of target information synchronization tasks required to be executed when the node serves as the remote node, to obtain sixth state.

For example, when the node needs to perform two target information synchronization tasks as the remote node, the foregoing first state may be taken as a target state (or a state is newly defined as the target state), and two first states are superimposed to obtain the sixth state corresponding to the second node event, which triggers that the node sequentially executes the two target information synchronization tasks according to the set execution order. The number of communication states that need to be maintained by the node may be further reduced by adopting one superimposed state to record that the node is in two received states.

In some embodiments, after converting the local node state of the node into a sixth state corresponding to the second node event, the method further includes:
   whenever the node completes one target information synchronization task as the remote node, converting the local node state of the node into a local node state from which one target state is removed.

For example, for the node in the superimposed state corresponding to the conflict between two receiving states, when the node completes one target information synchronization task as the remote node, the node is converted from the foregoing superimposed state into a corresponding single receiving state, so that the node is restored to a receiving-related communication state in the absence of a node event, and normally executes a corresponding target information synchronization task as the remote node. By introducing the sixth state into the conversion among the communication states, the node may complete communication state maintenance in the case of a plurality of remote receiving, thereby reducing the communication states that need to be maintained by the node.

Figure 8:
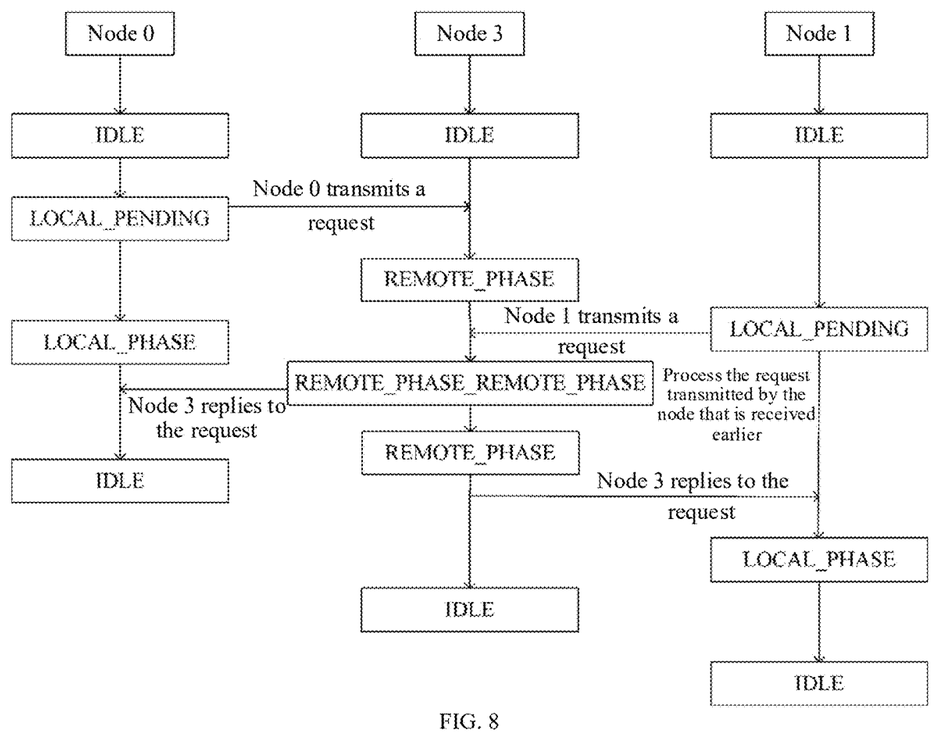
FIG. 8 is a schematic diagram of a communication state conversion under a conflict between two receiving states according to an embodiment of the present application.

Exemplarily, as shown in FIG. 8, a communication state conversion of a node under a conflict between two receiving states is as follows:
   1. A node 3 receives target requests transmitted by a node 0 and a node 1, and converts the local node state into a state superimposing two REMOTE-related states, which triggers the node to process remote receiving according to a set execution order (such as preferentially processing the target request received earlier).
   2. After the node 3 completes the remote receiving (that is, completes one target information synchronization task as a remote node), the local node state is converted into a REMOTE-related state which is not superimposed, so that the node maintains the current local node state by a method for maintaining a communication state in the absence of a node event.

Embodiment 3

An example of two target requests transmitted by a primary writing node is described in this embodiment.

In the case where a target node is newly added to a domain where a node is located, it is determined that a third node event occurs on the node, a target request is transmitted to the target node, and the target request is transmitted to an original remote node of the node.

It may be understood that considering that a newly added target node may replace an original primary writing node or remote node in the domain, that is, become a new primary writing node or a new remote node in the domain, two nodes before and after the target node are configured to synchronize their own target information to the target node, so that the target node completes the foregoing replacement operation. To avoid the case where the target information that is currently being executed and has not been completely synchronized is lost because the node synchronizing the target information to the target node is offline, the node synchronizing the target information to the target node is configured to also synchronize the target information to its original remote node at the same time. In this way, the target information loss due to the greater redundancy of the target information is avoided.

In an embodiment, during the recovery period of the target node, a target request is transmitted to the target node, and the target request is transmitted to the original remote node of the node. The target node does not transmit a target request during the recovery period to further reduce the communication states that need to be maintained by the node.

Figure 9:
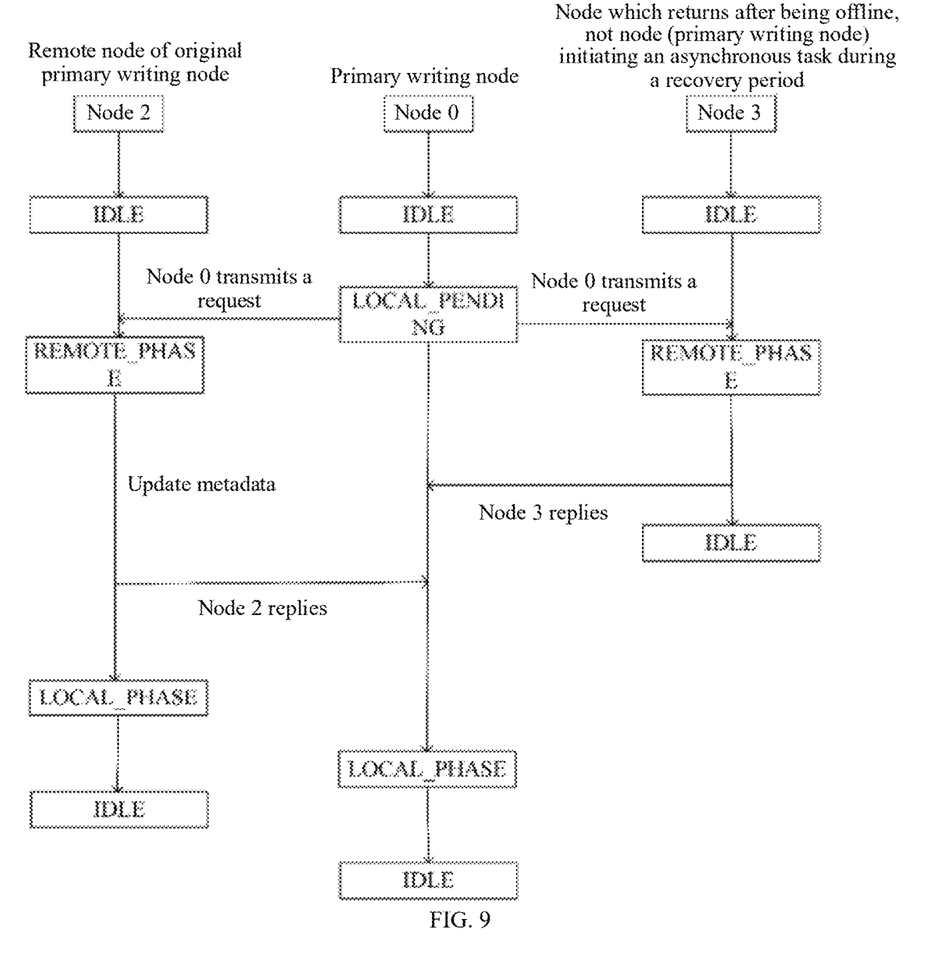
FIG. 9 is a schematic diagram of a communication state conversion of a target node and related nodes thereof according to an embodiment of the present application.

Exemplarily, as shown in FIG. 9, a communication state conversion of a newly added target node (a node 3), an original primary writing node (a node 0) replaced with the target node, and a remote node (a node 2) of the original primary writing node is as follows:
   1. The node 0 simultaneously transmits two target requests to the two nodes, and converts a local node state into LOCAL_PENDING, which characterizes that the node 0 is waiting for the two nodes to execute local update.

2. After receiving the target requests, the node 2 and the node 3 convert local node states into REMOTE_PHASE, and execute local update according to target information transmitted by the node 0.
3. The node 2 and the node 3 reply to the node 0 after completing the local update, and convert the local node states into IDLE, which indicate that the nodes complete the target information synchronization tasks, and after receiving replies from both the node 2 and the node 3, the primary writing node converts the local node state into LOCAL_PHASE, and executes local update.
4. After completing the local update, the node 0 converts the local node state into IDLE, which indicates that the node 0 completes the target information synchronization task.

Based on the foregoing embodiments, the present application achieves multi-node communication and the target information redundancy recovery process of the abnormal node events by adding the strategy of the superimposed state as well as the receiving-transmission state conversion and the execution order, and avoids the maintenance of a plurality of states for a plurality of nodes, thereby reducing communication states maintained for an asynchronous task on each node link, improving the searching efficiency of discovering a remote node by a node and the efficiency of communication between nodes, and further improving the execution efficiency of the target information synchronization task.

Figure 10:
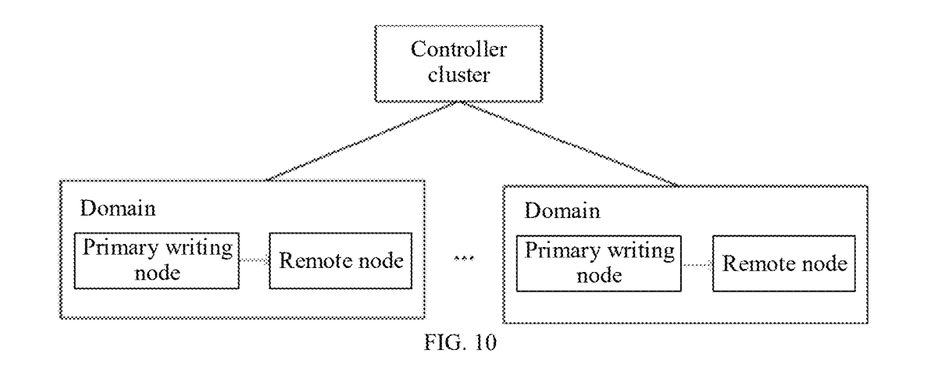
FIG. 10 is a schematic diagram of a controller cluster according to an embodiment of the present application.

In a second aspect, FIG. 10 is a schematic diagram of a controller cluster according to an embodiment of the present application, and the controller cluster includes a primary writing node and a remote node in at least one domain, and is configured to unidirectionally transmit a target request between the primary writing node and the remote node in the same domain according to a set communication direction. The target request is used for initiating a target information synchronization task.

The remote node is configured to receive the target request in the absence of a node event, and convert a local node state thereof into a first state. The first state is used for characterizing that the remote node is executing the target information synchronization task required to be executed when serving as the remote node.

The primary writing node is configured to transmit the target request in the absence of a node event, and convert a local node state thereof into a second state. The second state is used for characterizing that the primary writing node is executing the target information synchronization task required to be executed when serving as the primary writing node.

In some embodiments, the controller cluster further includes an offline target node.

The offline target node returns to a domain where a node is located, and the node is configured to transmit a target request to the target node during the recovery period of the target node, and transmit the target request to an original remote node of the node.

The target node is configured to receive the target request during the recovery period and not transmit the target request.

It may be seen from the foregoing technical solution that by configuring each node in the controller cluster to unidirectionally transmit the target request according to the set communication direction in the absence of a node event, the number of times of communication between nodes may be reduced in the case of meeting the target information synchronization requirements of each node. On this basis, the node may only maintain a communication state according to a receiving condition of the target request, and does not need to maintain a communication state for each surrounding node. In this way, the communication states that need to be maintained by the node may be reduced, thereby improving the execution efficiency of the target information synchronization task.

It should be noted that the controller cluster embodiment is similar to the method embodiment, so that the description is relatively simple. For the relevant part, refer to the method embodiment.

Figure 11:
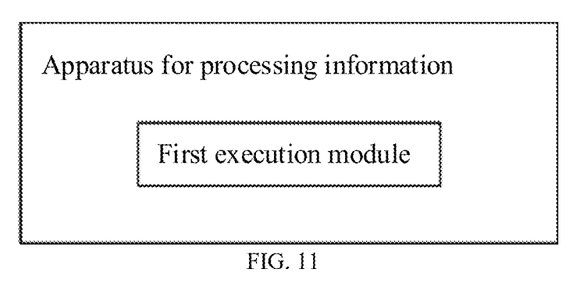
FIG. 11 is a schematic structural diagram of an apparatus for processing information according to an embodiment of the present application.

In a third aspect, the embodiments of the present application provide an apparatus for processing information, which is applied to any node in a controller cluster. As shown in FIG. 11, the apparatus includes:
  a first execution module, configured to execute any one of followings when there is no a node event:
    receive a target request, and convert a local node state of a node into a first state, the target request being used for initiating a target information synchronization task, and the first state being used for characterizing that the node is executing the target information synchronization task as a remote node; and
    transmit the target request, and convert the local node state of the node into a second state, the second state being used for characterizing that the node is executing the target information synchronization task as a primary writing node.

The controller cluster is configured to unidirectionally transmit the target request between the primary writing node and the remote node in the same domain according to a set communication direction.

In some embodiments, the apparatus further includes:
  a second execution module, configured to when a first node event occurs on the node, convert the local node state of the node into a third state corresponding to the first node event, the third state being used for characterizing that the node is executing the target information synchronization tasks as the primary writing node and the remote node at the same time.

In some embodiments, the apparatus further includes:
  a first processing module, configured to when the node is in the third state, determine a first execution order in which the node executes the target information synchronization tasks as the primary writing node and the remote node, respectively; and
  a second processing module, configured to convert the local node state of the node into a fourth state according to the first execution order, the fourth state being used for characterizing that the node is executing the target information synchronization task required to be executed when serving as the primary writing node and the target information synchronization task required to be executed when serving as the remote node, respectively, according to the first execution order.

In some embodiments, the second processing module includes:
  a first processing sub-module, configured to superimpose the first state and the second state according to the first execution order to obtain the fourth state; and
  a second processing sub-module, configured to convert the local node state of the node into the fourth state.

In some embodiments, the apparatus further includes:
  a third processing module, configured to when the node completes the target information synchronization task as the remote node, convert the local node state of the node into a local node state from which the first state is removed; and a fourth processing module, configured to when the node completes the target information synchronization task as the primary writing node, convert the local node state of the node into a local node state from which one second state is removed.

In some embodiments, the apparatus further includes:

a fifth processing module, configured to when the first node event occurs on the node and the node complete the target information synchronization tasks required to be executed when serving as the primary writing node and the remote node, respectively, convert the local node state of the node into a fifth state used for characterizing that no target information synchronization task is executed.

In some embodiments, the apparatus further includes:

a first determination module, configured to determine whether the first node event occurs on the node according to the local node state of the node and a current transmission condition of the target request.

In some embodiments, the apparatus further includes:

a second execution module, configured to when a second node event occurs on the node, convert the local node state of the node into a sixth state corresponding to the second node event, the sixth state being used for characterizing that the node is executing a plurality of target information synchronization tasks as the remote node.

In some embodiments, the apparatus further includes:

a sixth processing module, configured to superimpose target states with a same number as the plurality of target information synchronization tasks required to be executed when the node serves as the remote node, to obtain the sixth state.

In some embodiments, the apparatus further includes:

a seventh processing module, configured to whenever the node completes one target information synchronization task as the remote node, convert the local node state of the node into a local node state from which one target state is removed.

In some embodiments, the apparatus further includes:

an eighth processing module, configured to when the second node event occurs on the node and the node completes the plurality of target information synchronization tasks as the remote node, convert the local node state of the node into a fifth state used for characterizing that no target information synchronization task is executed.

In some embodiments, the apparatus further includes:

a ninth processing module, configured to when the node is in the sixth state, execute the plurality of target information synchronization tasks according to a receiving order of target requests corresponding to the plurality of target information synchronization tasks.

In some embodiments, the apparatus further includes:

a second determination module, configured to determine whether the second node event occurs on the node according to the local node state of the node and a current receiving condition of the target request.

In some embodiments, the apparatus further includes:

a tenth processing module, configured to when a target node is newly added to the domain where the node is located, determine that a third node event occurs on the node; and a request transmitting module, configured to transmit a target request to the target node, and transmit the target request to an original remote node of the node.

In some embodiments, the target node is a node which returns after being offline, and the request transmitting module includes:

a first request transmitting module, configured to transmit the target request to the target node during the recovery period of the target node, and transmit the target request to the original remote node of the node, the target node not transmitting the target request during the recovery period.

It may be seen from the foregoing technical solution that by configuring each node in the controller cluster to unidirectionally transmit the target request according to the set communication direction in the absence of a node event, the number of times of communication between nodes may be reduced in the case of meeting the target information synchronization requirements of each node. On this basis, the node may only maintain a communication state according to a receiving condition of the target request, and does not need to maintain a communication state for each surrounding node. In this way, the communication states that need to be maintained by the node may be reduced, thereby improving the execution efficiency of the target information synchronization task.

It should be noted that the apparatus embodiment is similar to the method embodiment, so that the description is relatively simple. For the relevant part, refer to the method embodiment.

Figure 12:
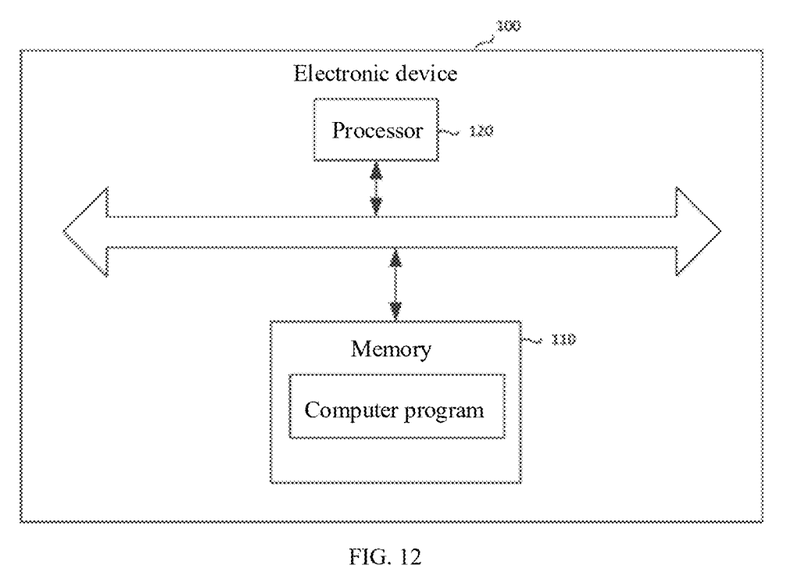
FIG. 12 is a schematic diagram of an electronic device according to an embodiment of the present application.

The embodiments of the present application further provide an electronic device. Refer to FIG. 12. FIG. 12 is a schematic diagram of an electronic device according to an embodiment of the present application. As shown in FIG. 12, an electronic device 100 includes: a memory 110 and a processor 120. The memory 110 and the processor 120 are communicatively connected via a bus, the memory 110 has a computer program stored therein, and the computer program may run on the processor 120 to implement the steps of the method for processing information disclosed in the embodiments of the present application.

Figure 13:
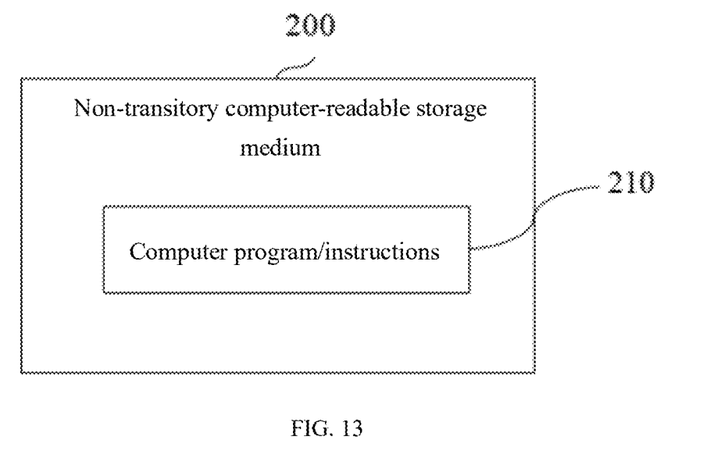
FIG. 13 is a schematic diagram of a non-transitory computer-readable storage medium according to an embodiment of the present application.

The embodiments of the present application further provide a non-transitory computer-readable storage medium. Refer to FIG. 13. FIG. 13 is a schematic diagram of a non-transitory computer-readable storage medium according to an embodiment of the present application. As shown in FIG. 13, a non-transitory computer-readable storage medium 200 has a computer program/instructions 210 stored therein. A processor executes the computer program/instructions 210 to implement the steps of the method for processing information disclosed in the embodiments of the present application.

The embodiments of the present application further provide a computer program product, which includes a computer program/instructions. A processor executes the computer program/instructions to implement the steps of the method for processing information disclosed in embodiments of the present application.

The various embodiments in this specification are described in a progressive manner, with each embodiment emphasizing its differences from other embodiments. The same and similar parts between the embodiments may be referred to each other.

Persons skilled in the art should understand that the embodiments of the present application may be provided as methods, devices, or computer program products. Therefore, the embodiments of the present application may take the form of fully hardware embodiments, fully software embodiments, or embodiments combining software and hardware aspects. Moreover, the embodiments of the present application may take the form of a computer program product implemented on one or more computer usable storage media (including but not limited to disk storage, CD-ROM, optical storage, etc.) containing computer usable program code.

The embodiments of the present application are described with reference to the flowchart and/or block diagram of the method, system, device, storage medium, and program product according to the embodiments of the present application. It should be understood that each process and/or block in the flowchart and/or block diagram, as well as the combination of processes and/or blocks in the flowchart and/or block diagram, may be implemented by computer program instructions. These computer program instructions can be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flowchart and/or one or more boxes in the block diagram.

These computer program instructions may also be stored in computer-readable memory that may guide a computer or other programmable data processing terminal device to operate in a specific manner, such that the instructions stored in the computer-readable memory generate a manufactured product including instruction devices that implement the functions specified in a flowchart or multiple flowcharts and/or a block diagram or multiple boxes.

These computer program instructions may also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flowchart and/or one or more boxes in the block diagram.

Although preferred embodiments of the present application have been described, those skilled in the art may make additional changes and modifications to these embodiments once they have knowledge of the basic inventive concept. Therefore, the attached claims are intended to be interpreted as including preferred embodiments and all changes and modifications falling within the scope of the embodiments of the present application.

Finally, it should be noted that in this specification, relational terms such as first and second are only used to distinguish one entity or operation from another, and do not necessarily require or imply any actual relationship or order between these entities or operations. Moreover, the terms "including/comprising", "containing", or any other variation thereof are intended to encompass non-exclusive inclusion, such that a process, method, article, or terminal device that includes a series of elements not only includes those elements, but also includes other elements not explicitly listed, or also includes elements inherent to such process, method, article, or terminal device. Without further limitations, the element limited by the statement "including one . . . " does not exclude the existence of other identical elements in the process, method, item, or terminal device that includes the element.

The above provides a detailed introduction to the information processing method, device, equipment, medium, and controller cluster provided in the present application. Specific examples are applied in this specification to explain the principles and embodiments of the present application. The above embodiments are only used to assist in understanding the method and core ideas of the present application. Meanwhile, for those skilled in the art, there may be changes in the specific implementation and application scope based on the ideas of the present application. Therefore, the content of this specification should not be understood as limiting the present application.

The invention claimed is:

1. A method for processing information, applied to any node in a controller cluster, wherein the method comprises:
   performing any of followings when there is no node event:
   receiving a target request, and converting a local node state of a node into a first state, the target request being used for initiating a target information synchronization task, and the first state being used for characterizing that the node is executing the target information synchronization task as a remote node; and
   transmitting the target request, and converting the local node state of the node into a second state, the second state being used for characterizing that the node is executing the target information synchronization task as a primary writing node;
   wherein the controller cluster is configured to unidirectionally transmit the target request between the primary writing node and the remote node in a same domain according to a set communication direction.

2. The method according to claim 1, further comprising:
   when a first node event occurs on the node, converting the local node state of the node into a third state corresponding to the first node event, the third state being used for characterizing that the node is executing target information synchronization tasks as the primary writing node and the remote node at the same time.

3. The method according to claim 2, further comprising:
   when the node is in the third state, determining a first execution order in which the node executes the target information synchronization tasks as the primary writing node and the remote node, respectively; and
   converting the local node state of the node into a fourth state according to the first execution order, the fourth state being used for characterizing that the node is executing the target information synchronization task required to be executed when serving as the primary writing node and the target information synchronization task required to be executed when serving as the remote node, respectively, according to the first execution order.

4. The method according to claim 3, wherein the converting the local node state of the node into a fourth state according to the first execution order comprises:
   superimposing the first state and the second state according to the first execution order to obtain the fourth state; and
   converting the local node state of the node into the fourth state.

5. The method according to claim 4, wherein after converting the local node state of the node into the fourth state, the method further comprises:
   when the node completes the target information synchronization task as the remote node, converting the local node state of the node into a local node state from which one first state is removed; and when the node completes the target information synchronization task as the primary writing node, converting the local node state of the node into a local node state from which one second state is removed.

6. The method according to claim 2, further comprising:
when the first node event occurs on the node and the node completes the target information synchronization tasks required to be executed when serving as the primary writing node and the remote node, respectively, converting the local node state of the node into a fifth state used for characterizing that no target information synchronization task is executed.

7. The method according to claim 2, further comprising:
determining whether the first node event occurs on the node according to the local node state of the node and a current transmission condition of the target request.

8. The method according to claim 1, further comprising:
when a second node event occurs on the node, converting the local node state of the node into a sixth state corresponding to the second node event, the sixth state being used for characterizing that the node is executing a plurality of target information synchronization tasks as the remote node.

9. The method according to claim 8, wherein before converting the local node state of the node into a sixth state corresponding to the second node event, the method further comprises:
superposing target states with a same number as the plurality of target information synchronization tasks required to be executed when the node serves as the remote node, to obtain the sixth state.

10. The method according to claim 9, wherein after converting the local node state of the node into a sixth state corresponding to the second node event, the method further comprises:
whenever the node completes one target information synchronization task as the remote node, converting the local node state of the node into a local node state from which one target state is removed.

11. The method according to claim 8, further comprising:
when the second node event occurs on the node and the node completes the plurality of target information synchronization tasks as the remote node, converting the local node state of the node into a fifth state used for characterizing that no target information synchronization task is executed.

12. The method according to claim 8, further comprising:
when the node is in the sixth state, executing the plurality of target information synchronization tasks according to a receiving order of target requests corresponding to the plurality of target information synchronization tasks.

13. The method according to claim 8, further comprising:
determining whether the second node event occurs on the node according to the local node state of the node and a current receiving condition of the target request.

14. The method according to claim 1, further comprising:
when a target node is newly added to the domain where the node is located, determining that a third node event occurs on the node; and transmitting the target request to the target node, and transmitting the target request to an original remote node of the node.

15. The method according to claim 14, wherein the target node is a node which returns after being offline, and the transmitting the target request to the target node, and transmitting the target request to an original remote node of the node comprises:
during a recovery period of the target node, transmitting the target request to the target node, and transmitting the target request to the original remote node of the node;
wherein the target node does not transmit the target request during the recovery period.

16. The method according to claim 7, further comprising:
determining that the first node event occurs on the node according to any one of following combinations of the local node state and the transmission condition comprising that:
the node transmits the target request when the node is in the first state; and
the node receives the target request when the node is in the second state.

17. A controller cluster, comprising a primary writing node and a remote node in at least one domain, wherein the controller cluster is configured to unidirectionally transmit a target request between the primary writing node and the remote node in a same domain according to a set communication direction, and the target request is used for initiating a target information synchronization task;
the remote node is configured to receive the target request when there is no node event, and convert a local node state thereof into a first state, the first state being used for characterizing that the remote node is executing the target information synchronization task required to be executed when serving as the remote node; and
the primary writing node is configured to transmit the target request when there is no node event, and convert a local node state thereof into a second state, the second state being used for characterizing that the primary writing node is executing the target information synchronization task required to be executed when serving as the primary writing node.

18. The controller cluster according to claim 17, further comprising an offline target node, wherein
the offline target node returns to a domain where a node is located, the node is configured to transmit the target request to the target node during the recovery period of the target node, and transmit the target request to an original remote node of the node; and
the target node is configured to receive the target request during the recovery period thereof and not transmit the target request.

19. An electronic device, comprising a memory, a processor, and a computer program stored in the memory, wherein the processor executes the computer program to implement the method for processing information according to claim 1.

20. A computer-readable storage medium, having a computer program/instructions stored therein, wherein a processor executes the computer program/instructions to implement the method for processing information according to claim 1.

* * * * *